Nov. 3, 1931.  R. PUNZMANN  1,830,335
MEAT LOAF PACKING MACHINE
Filed Feb. 29, 1928    2 Sheets-Sheet 1
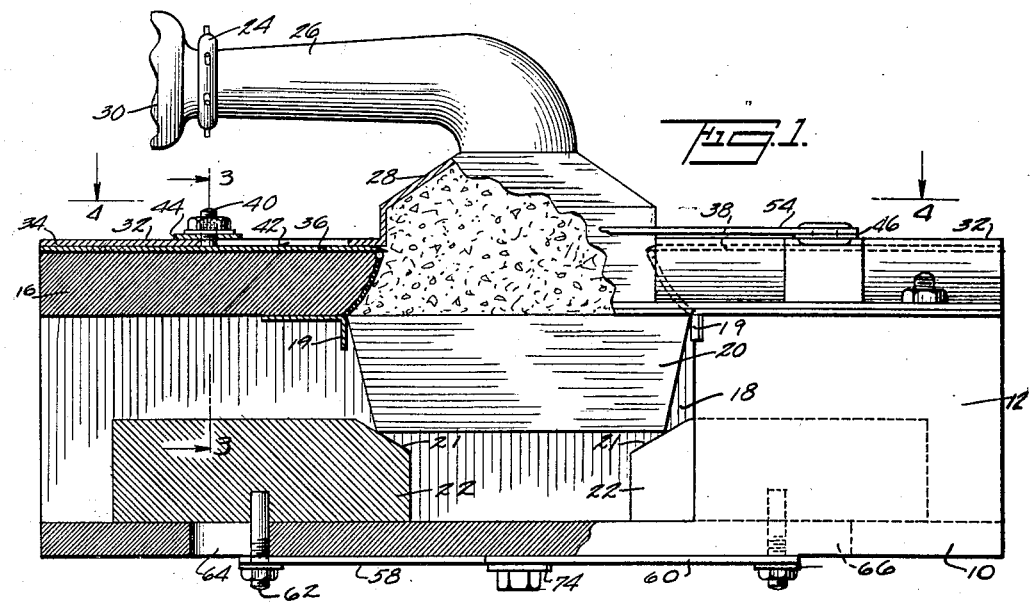
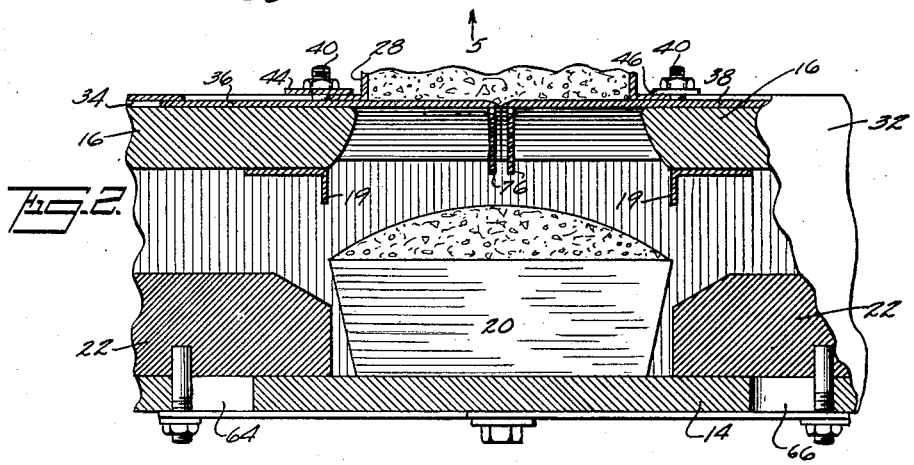

Nov. 3, 1931.  R. PUNZMANN  1,830,335
MEAT LOAF PACKING MACHINE
Filed Feb. 29, 1928  2 Sheets-Sheet 2
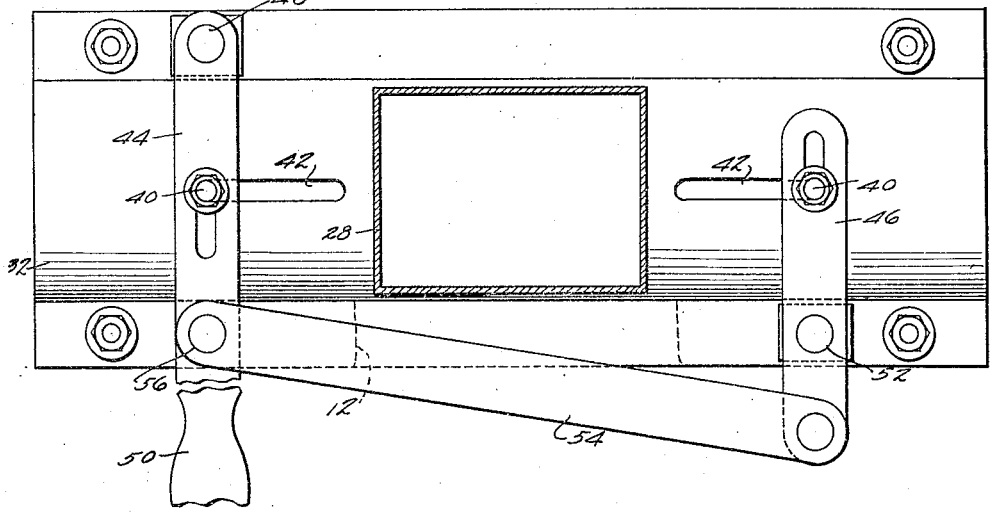
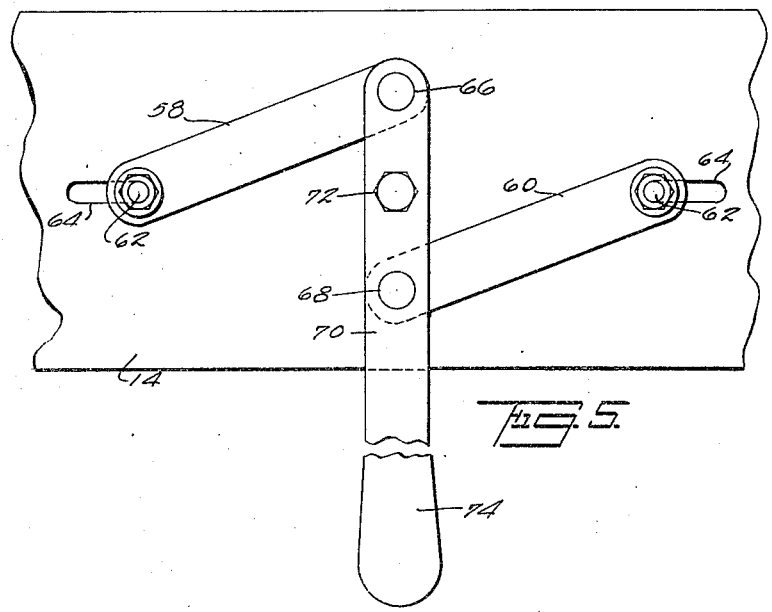
INVENTOR
Rudolf Punzmann
BY
ATTORNEY Patented Nov. 3, 1931

1,830,335

UNITED STATES PATENT OFFICE

RUDOLF PUNZMANN, OF NEW YORK, N. Y., ASSIGNOR OF ONE-HALF TO FRANK FIROR, OF NEW YORK, N. Y.

MEAT LOAF PACKING MACHINE

Application filed February 29, 1928. Serial No. 257,840.

It is an object of my invention to provide a packing machine for meat loaves and such like meat products which will be inexpensive to construct and which will be easy and positive in operation. In the past it has been found necessary to pack meat loaves and the like by kneading with the hands in order to eliminate the air spaces and reduce the product to a compact and shaped form as well as to thoroughly mix the ingredients.

It is a further object of my device to eliminate the necessity of touching the product in any way with the hands for the purpose of either eliminating these air spaces or for mixing the ingredients. This is entirely accomplished by my device automatically.

A further object of my device is to meet the requirements of the United States Government food inspectors in that the product is not manipulated by hand wherever possible. My invention will be more readily understood by reference to the accompanying drawings in which like numbers refer to like parts.

Fig. 1 is a partial side elevation and partial sectional view showing the pan receiving a charge of meat product. Fig. 2 is a sectional view similar to Fig. 1 with the parts shown in position after the pan has been filled and ready for removal. Fig. 3 is a sectional view taken on the plane 3—3 of Fig. 1. Fig. 4 is a plan section taken on the plane 4—4 of Fig. 1. Fig. 5 is an inverted plan view looking in the direction of the arrow 5 of Fig. 1.

By reference to Fig. 1 it will be seen that the machine consists mainly of a body portion 10 having side walls 12, a base 14 and a top 16. There is an opening 18 in the front wall (the wall facing the operator and into which the pan is inserted) through which a pan 20 is passed between the guides 19 and placed upon the beveled edges 21 of a pair of slidable blocks 22. The blocks slide on the base 14 and between the walls 12 as shown in Fig. 3. A locking collar 24 connects a neck 26 of a feed spout 28 to the meat grinding machine a part of which is shown at 30, Fig. 1. The spout 28 projects upward from a cover 32 secured to the top 16 with a space 34 between the cover and the top 16 to permit sliding knife plates 36 and 38 to pass between the same. Bolt shanks 40 in said knife plates 36 and 38 project through elongated slots 42 in the cover 32 connecting said knife plates with the levers 44 and 46. Lever 44 is pivotally mounted at 48 and has a handle 50 at its forward end. The lever 46 is pivotally mounted at 52 and has a link 54 pivoted to the levers 44 and 46.

A pair of links 58 and 60 are located on the under side of the base 14 and are connected to the bolt shanks 62 in the blocks 22. The said shanks 62 also pass through elongated slots 64 in the base 14. The other end of each of these links 58 and 60 is secured at 66 and 68 to a lever 70 said lever being pivotally mounted on the base 14 at 72 and having an operating handle 74. Rubber flaps 76 are secured by riveting or in any other conventional manner to and near piercing edges of the knife plates 36 and 38 for a purpose to be hereinafter described. The operation of the device is as follows:

The pan 20 is passed through the opening 18 between the guides 19 and placed on the beveled edges 21 of blocks 22 directly under spout 28, the knife plates 36 and 38 to be in the closed position as shown in Fig. 2. The pan is now about to be filled with the chopped meat so the operator pulls the handle 50 to the left and until the levers 44 and 46 are in position as shown in Fig. 4 the knives then being in open position as shown in Fig. 1.

The pressure behind the meat in the spout 28 forces same into the pan 20 as shown in Fig. 1 and removes all air spaces and thoroughly mixes the product. The handle 50 is now pulled to the right which closes the knife plates, which in closing form a mound shape or loaf shape portion above the pan due to the curved shape of the knife plates and the action of the rubber flaps 76. As shown in Fig. 2 these flaps have the general shape of the curved knife edges to which they are attached. They are approximately one inch thick. The knife, of course, shapes the top of the loaf in a curved manner, as shown, to resemble the shape of an ordinary loaf of bread. The flaps function to shape the ends of the curved top to further resemble the top of an ordinary old-fashioned loaf of bread. These flaps also smooth over the entire top of the loaf. Also these rubber flaps when the knives are in open position and the pan is placed against the spout serve as overlapping protection to prevent the chopped meat from escaping along the sides and to hold the pressure. It must be observed that the flaps 76 attached to the cutting edges of the knife plates 36 and 38 do not make an exact incline shaped loaf on its ends from the top of the pan upward but rather make a shape resembling an old fashioned bread loaf, the functioning of the plates being not only to partially shape the ends of the loaf, but as stated above, to help retain the pressure and to thus assist in the compacting of the material in the can. Immediately after the knife plates are closed the lower handle 74 is pulled to the left causing blocks 22 to be moved outwardly and release the pan of meat leaving same in the position shown in Fig. 2. After removing the pan the blocks 22 are returned to their inward position by means of the handle 74 and the filling operation continues. The pans are removed manually.

Having thus described my invention what I claim and desire to secure by United States Letters Patent is:

1. In a meat loaf packing machine, slidable beveled blocks adapted to hold a receptacle in position beneath the outlet pipe of a chopping machine and slidable cutting plates shaped to conform to the desired form of the material as it is placed in the receptacle and simultaneously adapted to intercept the produce feed supply, all as and for the purposes hereinbefore set forth.

2. In a meat loaf packing machine, slidable beveled blocks adapted to hold a receptacle in position beneath the outlet pipe of a chopping machine and slidable cutting plates shaped to conform to the desired form of the material as it is placed in said receptacle and simultaneously adapted to intercept the produce feed supply, said slidable cutting plates having positioned, adjacent their cutting edges, flexible flaps, all as and for the purposes hereinbefore set forth.

3. In a meat loaf packing machine, an outlet supplying chopped meat under pressure into a receptacle, co-acting cutting knives positioned to intercept the flow of said supply, said knives shaped to form a loaf like top to the meat in said receptacle, beveled edge blocks supporting said receptacle when in spaced relation to said outlet, manually operated leverage means to operate said blocks and separately operated leverage means for said knives.

4. In a meat loaf packing machine, an outlet supplying chopped meat under pressure into a receptacle, co-acting cutting knives positioned to intercept the flow of said supply, said knives shaped to form a loaf like top to the meat in said receptacle, beveled edge blocks supporting said receptacle when in spaced relation to said outlet, manually operated leverage means to operate said blocks and separately operated leverage means for said knives, flexible flaps securely affixed to the edge of said knives.

In witness whereof I have hereunto set my hand to these specifications this 24th day of February, 1928.

RUDOLF PUNZMANN.